United States Patent Office 3,206,482
Patented Sept. 14, 1965

3,206,482
EPOXY ETHERS
David Bruce Bright, Oakland, Calif., assignor to Shell Oil Company, a corporation of Delaware
No Drawing. Filed Dec. 28, 1959, Ser. No. 862,027
2 Claims. (Cl. 260—348.6)

This invention relates to a new class of epoxy materials and to their preparation and cure. More particularly, the invention relates to new liquid epoxy ethers having exceptionally high halogen contents, their preparation and their utilization.

Specifically, the invention provides new and particularly useful epoxy ethers, and preferably polyglycidyl polyethers, which contain at least about 19 percent by weight of halogen, and methods for preparing them by condensing in a substantial molar excess a halo-epoxy-substituted alkane, such as epichlorohydrin, with a polyhydric phenol, such as a bis-phenol obtaining a polyhalosubstituted polyhydroxy-substituted polyalkoxyalkane which contains at least five residues of the halo-epoxy-substituted alkane for each residue of said phenol, and treating the resulting product with an alkaline material. The invention further provides cured insoluble, infusible products obtained by reacting the new polyepoxy materials with epoxy curing agents alone or in admixture with other epoxy compounds.

As a special embodiment, the invention provides a liquid product containing at least about 19 percent by weight chlorine, comprising essentially ethers of the formula (I)

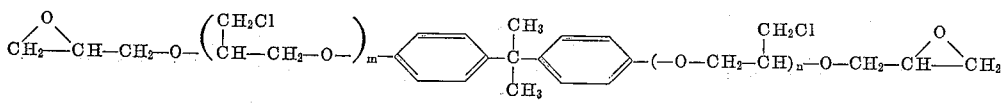

wherein the sum of $m$ and $n$ is from 3 to 25, which are obtained by condensing 2,2 - bis(4 - hydroxyphenyl)propane with a substantial molar excess of epichlorohydrin, obtaining a halo-substituted condensation product and treating the resulting product with alkaline material.

The invention also provides novel insoluble infusible products obtained by curing these special glycidyl ethers.

It is an object of the invention to provide a new class of polyepoxy materials. It is a further object to provide new liquid polyepoxy polyethers characterized by containing halogen in excess of about 19 percent by weight, the novel compounds being prepared from condensation products of halo-epoxy-substituted alkanes with small portportions of polyhydric phenols, and to provide methods for their preparation. It is a further object to provide new polyepoxy materials that are particularly useful in the preparation of surface coating compositions. It is a further object to provide new polyepoxy materials that form coatings having improved flexibility and good resistance to water. It is a further object to provide new epoxy ethers that contribute self-extinguishing characteristics to cured resin foams, paper laminates and other compositions. It is a further object to provide resinous plasticizer-stabilizers for halogen-containing polymers. Other objects and advantages of the invention will be apparent from the following detailed description thereof.

It has now been discovered that these and other objects may be accomplished by the new products of the invention comprising liquid epoxy ethers, and preferably polyglycidyl polyethers, containing halogen in excess of about 19 percent by weight, obtained by condensing a substantial molar excess of a halo-epoxy-substituted alkane, such as epichlorohydrin, with a polyhydric phenol and treating the resulting halo-substituted product with an alkaline material. It has been found that these special polyepoxy materials can be easily cured to form insoluble, infusible products having many attractive properties. The cured products include coatings having excellent flexibility and good resistance to water. This was unexpected in view of the large amount of chlorine in the resinous polymers. Further, especially useful cured products prepared from the new epoxy ethers include foamed resins and laminates having self-extinguishing characteristics.

The expression "halo-epoxy-substituted alkane" as used herein refers to those alkanes having a vic-epoxy group, i.e., a

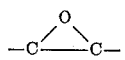

group, attached directly to a halogen-bearing carbon atom, such as, for example, epichlorohydrin, epibromohydrin, 1,4-dichloro-2,3-epoxybutane, 1-chloro-2,3-epoxypentane and the like. Especially preferred are the halo-epoxy-substituted alkanes containing from 3 to 8 carbon atoms.

The expression "polyhydric phenols" as used herein refers to compounds having two or more hydroxyl groups attached to one or more benzene rings, i.e., the expression refers to polyhydric phenols including monocyclic and polycyclic ones. Although the starting materials for use in preparing the novel compounds of this invention may be polyphenols having more than two hydroxyl groups, e.g., pyrogallol, phloroglucinol or novolaks, the most preferred starting materials are bisphenols. Especially preferred is 2,2-bis(4-hydroxyphenyl)propane, which is commercially available. No great advantages are generally obtained by substituting other, less readily available polyhydric phenols. However, many such compounds are known to be useful in conventional condensation reactions with epichlorohydrin and the like and may also be used in the present invention. These include, for example, 2,2-bis(2-hydroxyphenyl)propane, 2,2-bis(3-hydroxyphenyl)propane, the 2,2-diphenylpropanes in which each ring has a hydroxy group in a different isomeric position, 1,1-bis(4-hydroxyphenyl)propane, 2,2 - bis(4 - hydroxyphenyl)butane, 2,2 - bis(4 - hydroxy-3,5-dimethylphenyl)propane, and the like. The polyphenols suitable in this invention may also be substituted with other non-interfering groups, particularly with halogens. Particularly preferred for some uses is 2,2-bis(4-hydroxy - 3,5 - dichlorophenyl)propane. Other suitable compounds include the partially halogenated analogues of 2,2-bis(4-hydroxyphenyl)propane including those having one, two, and three chlorine atoms; one, two, and three fluorine atoms and various proportions of both chlorine and fluorine atoms in each benzene ring.

A suitable group of polyhydric compounds having more than two OH groups per molecule are the phenol-aldehyde condensation products known as "novolaks." These are produced by condensation of a phenol and an aldehyde, generally formaldehyde, in an acidic medium. The phenol-aldehyde ratio is greater than one. The novolaks are permanently fusible, soluble compounds having a typical formula

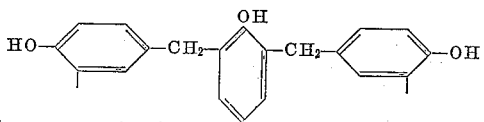

Their mean molecular weight is usually less than 1000.

The novel compounds of this invention may be prepared by two slightly different courses of reaction. For convenience, the two methods will be designated methods "A" and "B." Method "A" consists of a single condensation step employing an acidic catalyst followed by a conversion step in which the condensation product is reacted with an alkaline material. Method "B" consists of two separate condensation steps, the first employing an alkaline and the second an acidic catalyst, and these are followed by a conversion step identical to that of method "A." Between the first and second condensation steps of method "B," the first condensate is treated with anhydrous hydrogen halide to convert all of it to the polyhalo polyhydroxy form.

Method "A" is suitable for use with polyhydric phenols in which the phenolic OH group is relatively reactive. It is not suitable for polyhalosubstituted phenols.

In the condensation step in method A, one of the above described halo-epoxy-substituted alkanes is reacted with a relatively small proportion of a polyhydric phenol to form an addition product in the presence of a condensation catalyst which is an acid of the type generally designated as "Lewis acid." Lewis acids are defined, for example, in "Advanced Organic Chemistry" by G. M. Wheland, John Wiley and Sons, 1949, pages 80 et seq. Suitable condensation catalysts of this type include hydrofluoric acid, tin tetrachloride, boron trifluoride and complexes of boron trifluoride, especially its complex with ether. The concentration of the catalyst employed will vary, depending upon the catalyst and the molecular weight of polymer desired. In general, the catalyst will be employed in amounts varying from about 0.1% to about 5% by weight of the reactants.

The condensation step according to method "A" results directly in a product which comprises a large proportion of halosubstituted polyhydroxy-substituted polyalkoxyalkanes which contain on the average one residue of the polyhydroxycyclic compound per molecule, interlinked by ether oxygens. Typical of these compounds are those prepared from epichlorohydrin and bis-phenol which may be represented by the general formula (II)
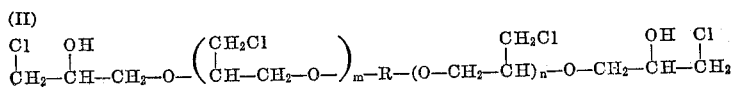

wherein the sum of $m$ and $n$ is from 3 to 25, and R is a gem-diphenylalkane group of the type

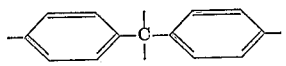

The condensation product according to method "A" generally also contains a substantial proportion of side reaction products. The total product, however, is nevertheless characterized by a high proportion of residues of the halo-epoxy-substituted alkane, and a high halogen content. The condensation products are converted to the desired product in a conversion step which is identical with that of method "B," and will be described hereafter.

Method "B" is particularly designed for the conversion of various types of phenolic compounds; it can be suitably applied to poly-halo-substituted phenolic compounds such as 2,2-bis(4-hydroxy-3,5-dichlorophenyl)-propane, whereas these cannot be converted by method "A."

In the first condensation step of method "B," one of the above-described halo-epoxy-substituted alkanes is reacted with a relatively small proportion of a polyhydric hydroxycyclic compound in the presence of a catalytic amount of a basic condensation catalyst. A great variety of known basic condensation catalysts are suitable, including for example, tertiary amines, sodium hydroxide, and the like. They are suitably employed in amounts ranging from 0.1 to 5% by weight of the reactants. The basic catalysts are used in anhydrous form. The condensation reaction results in a mixture of compounds in which some are polyhalo-substituted, polyhydroxy-substituted, polyalkoxyalkanes of the same type described above with respect to method "A" while some are similar compounds in which the chlorine and an adjoining hydroxyl group have reacted in the presence of the basic compound to form a vic-epoxy group. In order to convert all of the compound present to the desired polyhalo polyhydroxy form, residual basic compound is removed from the reaction mixture, the resulting material is distilled to remove remaining excess halo-epoxy-substituted alkanes and their dimers if present and the residue is then contacted with anhydrous hydrogen halide, preferably in benzene solution. After the reaction with hydrogen halide is complete, any excessive amount thereof is removed.

The product prepared in the above-described manner contains no more than one halohydroxyalkane group for each OH group originally present in the polyhydric compound. This compound is then condensed in the second condensation step of method "B" with an additional amount of the desired halo-epoxy-substituted alkane in the presence of an acidic condensation catalyst of the kind used in the condensation step of method "A." The material resulting from this additional condensation step is then similar to the reaction product from the single acidic condensation step of method "A." It will generally contain a higher proportion of the type of compound represented by Formula II and a lower proportion of side reaction products.

The ratio of halo-epoxy alkane residues to polyhydric polycyclic groups in the final condensation product is determined largely by the ratio of halo-epoxy-substituted alkane to polyhydroxycyclic compound employed selected for the single condensation step of method "A" or the second condensation step of method "B."

In method "A," the halo-epoxy-substituted alkane is employed in a ratio of at least 2½ mols per hydroxy group of the polyhydric phenol. Suitable molar ratios of halo-epoxy-substituted compound to polyhydric phenol are from 5 to 27:1 in the case of dihydric phenols and proportionately higher for those with more hydroxy groups. In method "B," the halo-epoxy-substituted alkane is employed in very substantial excess in the first condensation step, but only one molecule thereof adds to the polyhydric phenol for each of its hydroxy groups. In the first condensation step, the ratio of substituted alkane to polyhydric phenols is suitably at least about 5 moles of the former per hydroxy group of the latter. When using a dihydric phenol, the mole ratio of the compounds is preferably between about 10 and 20:1. When using polyhydric phenols having more than two OH groups preferred mole ratios are proportionately greater, e.g. 15–30:1 for a trihydric phenol. In the second condensation step of method "B" the halo-epoxy-substituted alkane is employed in a ratio of at least 1½ mols per hydroxy group of the original polyhydric phenol. Suitable ratios are from 3 to 25 mols per mol of first step condensation product of a dihydric phenol.

The ratio of reactants selected in a given preparation will depend on the molecular weight of the polymer desired, the higher ratios giving higher molecular weights, higher chlorine contents and higher viscosities. Polymers having particularly outstanding properties in the formation of coatings are those wherein the halo-epoxy alkane residue and a dihydric phenol residue are present in ratios in the range from 5:1 to 20:1.

In the single condensation step of method "A" and in the acid-catalyzed second condensation of method "B," best results are obtained when the halo-epoxy-substituted alkanes are added slowly throughout the course of the reaction. Care should be taken that these materials react continuously and do not accumulate in the reaction mixture in unconverted form because otherwise a violent reaction may result.

When employing reactant ratios of 10:1 or higher in acid catalyzed condensation to obtain polymers of higher molecular weight it may be desirable to add further portions of acidic catalyst after part of the reaction has been completed. It is suitable, for example, to add a second portion of from 0.1 to 5% by weight of acidic catalyst after the acid catalyzed reaction is about half complete.

The temperatures used in the condensation reaction may vary over a wide range. In general, the temperature employed in the acidic condensation step is suitably in the range from 30° to 150° C., and preferably from 50° to 100° C. Higher temperatures result in faster reaction rates but also may result in production of more highly colored products. The basic condensation reaction of method "B" is suitably carried out at a relatively elevated temperature in the above ranges, e.g., close to 100° C. The reaction mixture is maintained at this temperature by cooling during the exothermic stage while reagent is added and may later be heated until substantially all the halo-epoxy-substituted alkane has polymerized. In general, the condensation will require from about 1 to 25 hours, depending upon catalyst and temperature employed.

The polymers of Formula II or the like, prepared as described above, are treated with an alkaline material to produce the desired epoxy ethers. This conversion step is common to methods "A" and "B." The reaction may be accomplished by adding the alkaline material directly to the reaction mixture used in preparing the polymers or the polymer may be recovered before it is combined with the alkaline material.

Any of the known dehydrohalogenation materials may be used in this reaction, such as sodium and potassium hydroxide, sodium and potassium carbonates and bicarbonates, hydroxides of magnesium, zinc, lead, iron and aluminum, and the corresponding oxides, etc. The aluminates, silicates and zincates of alkali salts, such as sodium and potassium aluminate and sodium and potassium zincate, are particularly good dehydrohalogenating agents when used in substantially, or completely, non-aqueous media.

The amount of the dehydrohalogenating agent used may vary over a considerable range. If all of the halohydrin groups

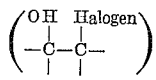

groups are to be converted to epoxy groups, the halohydrin should be reacted with an amount of the alkaline material which is at least equivalent to the hydrogen halide content of that halohydrin. Thus, if all of the halohydrin groups on the polymer noted above are to be converted to epoxy groups, the above product should be reacted with enough alkaline material to provide at least one mole of effective alkaline material, i.e., one mole present after acidic catalyst has been neutralized, per halohydrin group. Less than the equivalent amount of the alkaline material may be used if all of the halohydrin groups are not to be converted to the epoxy groups.

In most cases, the alkaline material may be applied to the halohydrin as an aqueous solution or suspension or dissolved in an inert solvent, such as ethers, aliphatic, cycloaliphatic and aromatic hydrocarbons, halogenated hydrocarbons, and the like. If the above-noted aluminates, silicates or zincates are used as the alkaline material, the dehydrohalogenationn is preferably effected in a non-aqueous medium and the salts as by themselves or dissolved in organic solvents or diluents. Carbon tetrachloride, 1,4-dioxane and dichloroethyl ether are particularly satisfactory as solvents for this purpose.

In most cases, the dehydrohalogenation reaction may be accomplished at temperatures which preferably range from about 20° C. to 150° C. and still more preferably 25° C. to 80° C.

At the end of the reaction period, the reaction mixture may be filtered through a suitable filtering medium, e.g., diatomaceous earth, to remove any alkali metal halide and any excess catalyst. The filtrate may then be treated to recover the epoxide. If the reaction has been conducted in the presence of water, care should be taken to avoid hydrolysis of the epoxide groups during the separation process. This can be accomplished by various extraction or distillation methods using subatmospheric pressures and conditions unfavorable to hydrolysis of the epoxide groups. Separation may be conveniently effected by treating the aqueous reactant mixture in a continuous extraction apparatus wherein any suitable extractant such as ester, alcohol, ether, hydrocarbon, etc., may be utilized. The extracted epoxide may be separated from its solution with the extractant by subjecting the preferably anhydrous solution to distillation or fractionation operation.

In the case where the reaction has been conducted in the absence of water, but in the presence of solvents, as is preferably the case with the above-described aluminates, silicates and zincates, the novel polyepoxy polyethers may be recovered by any suitable method, such as distillation, extraction, and the like. If no solvent or diluent is employed, the polyether polyepoxide may be recovered and purified by any convenient method, such as distillation under reduced pressure, extraction, fractional precipitation, and the like.

The epoxy ethers formed as the predominant constituent of product made by the above methods may be represented by the general formula (III)

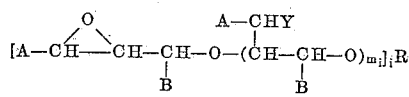

wherein Y is a halogen atom; each A and B is a member of the group consisting of hydrogen and hydrocarbon radicals, preferably containing no more than 6 carbon atoms; R is the residue of a polyhydric phenol including halogen-substituted ones, preferably of a bisphenol, and most preferably of a gem-diphenylalkane group of the type

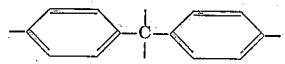

which may contain halogen substituents; $i$ is a series of integers corresponding to the number of hydroxyl groups in said polyhydric compound, and the sum $\Sigma\ m_1, m_2 \ldots m_i$ is at least 3. To further explain Formula III, let L and M represent, respectively, the end group and the group shown in parentheses in Formula III. Formula III thus becomes $[L—(M)_{m_i}]_i R$. When the formula is to represent the product of a dihydric compound for example, $i=2$, $m_i$ becomes $m_1$ and $m_2$ and the formula converts to $L—(M)_{m_1}—R—(M)_{m_2}—L$, wherein $\Sigma\ m_1, m_2 > 3$, i.e., $$m_1 + m_2 > 3$$

Similarly, the product of a trihydric compound corresponds to

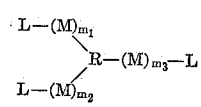

wherein $\Sigma\ m_1, m_2, m_3 > 3$.

It will be understood that even in a careful preparation according to method A or B the reaction product comprises a mixture of individual compounds of the above general formula. In each individual molecule, of course, $m_1$, $m_2$, etc., represent whole numbers. Each may be 0 or an integer from 1 to about 15 and is usually at least 2. The average value of the sum of $m_1$, $m_2$ . . . $m_i$ generally is a fractional number, greater than 3. This is due to the fact that the product contains several different compounds in which the values of $m_1$, $m_2$, etc., are not necessarily identical and in which the sum of $m_1$, $m_2$ . . . $m_i$ is different for different molecules.

The epoxy ethers of the invention are fluid or viscous liquids to semi-solids having at least one epoxy group and preferably more than one epoxy group per molecule and possessing above about 19% by weight of halogen. The epoxy ethers are soluble in most solvents, such as ketones, alcohols and liquid hydrocarbons, and are compatible with many synethetic oils and resins.

For certain applications, such as in the preparation of surface coating, fibers or filaments, it is sometimes desirable to have products of still higher molecular weights. Such products may be obtained by reacting the above described polyepoxy ethers with polyhydric compounds. Polyhydric compounds used for this purpose may be any polyhydric alcohol or polyhydric phenols. Polyhydric phenols that may be used for this purpose include, among others, resorcinol, catechol, hydroquinone, methyl resorcinol, and polynuclear phenols such as 2,2-bis(4-hydroxyphenyl)propane.

The new polyepoxy materials of this invention and their higher molecular weight derivatives produced as shown in the preceding paragraph may be polymerized through the epoxy groups to form valuable polymeric products. They may be polymerized alone or with other polyepoxide materials in a variety of different proportions, such as, for example, with amounts of other polyepoxides varying from 5% to 95% by weight. Polyepoxides that may be copolymerized with these new polyepoxides include, among others, glycidyl polyethers of polyhydric phenols obtained by reacting polyhydric phenols, such as bisphenol, resorcinol, and the like, with an excess of chlorohydrin, such as epichlorohydrin in an alkaline medium; polyepoxide polyethers obtained by reacting an alkane polyepoxide polyol, such as glycerol and sorbitol, with epichlorohydrin and dehydrohalogenating the resulting product; polymers prepared from ethylenically unsaturated epoxides, such as allyl glycidyl ether, alone or with other ethylenically unsaturated monomers; and polyepoxide polyethers obtained by reacting a polyhydric alcohol or polyhydric phenol with any of the above-described polyepoxides. The glycidyl polyethers of polyhydric phenols obtained by condensing the polyethers of polyhydric phenols with epichlorohydrin in an alkaline medium are also referred to as "ethoxyline" resins. See Chemical Week, vol. 69, page 27, for September 8, 1951.

A great variety of different curing agents may be employed in effecting the above-described homo- and copolymerization. Such agents include, among others, carboxylic acids or anhydrides, such as oxalic acid and phthalic anhydride; Friedel-Crafts metal halides, such as aluminum chloride, zinc chloride, ferric chloride and boron trifluoride as well as complexes thereof with ethers, acid anhydrides, ketones, diazonium salts, etc.; phosphoric acid and partial esters thereof including n-butyl orthoacid, diethyl orthophosphate and hexaethyl tetraphosphate; amino compounds, such as triethylamine, ethylene diamine, diethylamine, diethylene triamine, triethylene tetramine, dicyandiamide and melamine; and salts of inorganic acids, such as zinc fluoborate, potassium persulfate, nickel fluoborate, copper fluoborate, selenium fluoborate, magnesium fluoborate, tin fluoborate, potassium perchlorate, cupric sulfate, cupric phosphate, cupric phosphate, magnesium arsenate, magnesium sulfate, cadmium arsenate, cadmium silicate, aluminum fluoborate, ferrous sulfate, ferrous silicate, manganese hypophosphite, nickel phosphate and nickel chlorate.

The amount of the curing agents employed may vary over a considerable range depending upon the agent selected. With curing agents having replaceable hydrogen, such as the amine agents, amounts of agent employed vary up to and including equivalent proportions, i.e., sufficient curing agent to furnish a replaceable hydrogen atom for every epoxy group to be reacted. In most cases, satisfactory cures are obtained with amounts varying from 1% to 25% by weight of the material being polymerized. With the phosphoric acid and esters, particularly preferred amounts vary from about 3% to 20% by weight. The other curing agents are preferably employed in amounts varying from 1% to 20%.

The higher molecular weight hydroxy-containing ethers may also be cured through the hydroxy group by the addition of appropriate amounts, e.g., 1% to 25% by weight of polybasic acids or anhydrides, polyisocyanates, and the like.

The curing is preferably effected by mixing the curing agent with the polyepoxide and heating the mixture together, preferably at temperatures ranging from about 40° C. to 200° C. Solvent or diluents may be employed in the polymerization depending upon the intended application of the polymer and ease of operation of the polymerization reaction.

If the polyepoxides and their higher molecular weight derivatives are to be used in the preparation of castings or pottings, the curing agent and the epoxy material are generally combined together and then poured into the desired mold or casting containing the electrical wires or apparatus and the mixture heated to effect the cure.

The polyether polyepoxides and their higher molecular weight derivatives may also be employed with the aforedescribed curing agents to prepare improved surface coating compositions of the air-drying or baking type. In utilizing the products for this application, it is generally desirable to combine the epoxy material and curing agent with the desired solvents, and if desired, other film-forming materials and driers, and then apply the resulting mixture to the surface to be coated. Film-forming materials that can be used with the epoxy material in this manner include the drying oils, such as tung oil, linseed oil, dehydrated castor oil, soyabean oil, and the like; cellulose derivatives such as cellulose nitrate, cellulose acetate, cellulose acetate butyrate, cellulose propionate, ethyl cellulose, and mixtures thereof; and vinyl polymers, such as polymers of vinyl chloride, vinylidine chloride, methyl methacrylate, diallyl phthalate, and the like. The coatings prepared in this manner may be allowed to set to a hard finish at room temperature or heat may be applied to hasten the cure.

The new polyether polyepoxides may also be employed with the curing agents to prepare valuable adhesive compositions. In utilizing the products for these applications, it is generally desirable to combine the liquid epoxy material alone or with other epoxy resins with conventional fillers and curing agents and then to use the spreadable fluid as adhesive for materials, such as wood, plastic, metal and the like.

In a particularly useful application, the new polyether polyepoxides are employed to impart self-extinguishing characteristics to laminates, particularly paper laminates. The new polyether polyepoxides may be combined with conventional liquid polyepoxides, fillers and curing agents and in particular for the best flame resistant characteristics some antimony oxide will be added. The mixture is made up as a liquid, suitably by use of a diluent such as a monoepoxide, e.g., allyl glycidyl ether, and the laminate prepared in otherwise conventional manner.

In another useful application, the new polyether is added in amounts from 5 to 50% or more, based on the total mixture, to composites of polyepoxides which are expanded during cure by release of gases or vapors to form cellular resin foams. Epoxy resin foams are described in U.S. 2,739,134 to Parry et al., U.S. 2,831,820 to Aase et al., and other publications. Use of the novel ethers of this invention imparts flame resistance to the resulting foams. It may also increase the flexibility of the foams.

In addition, the new epoxy ethers may be used as stabilizing agents for various halogen-containing polymers, and particularly the vinyl halide polymers. These products may be used as stabilizers, alone or in combination with other stabilizing agents, such as urea and thiourea derivatives. In most cases, the products are effective as stabilizers in amounts varying from about 1% to 5% by weight of the polymer being stabilized. The epoxy material may be combined with the halogen-containing polymer by any suitable method, such as by dissolving the products in a suitable solvent or by milling the products together on a suitable roll mill.

They may also be used as secondary plasticizers in combination with plasticizers, such as dioctyl phthalate, and the like.

To illustrate the manner in which the invention may be carried out, the following examples are given. It is to be understood that the examples are for the purpose of illustration and the invention is not to be regarded as limited to any of the specific compounds or conditions recited therein. Unless otherwise specified, parts disclosed in the examples are parts by weight and moles are gram molecular weights.

*Example I*

This example illustrates the preparation according to method A, supra, of a polymeric diglycidyl ether of the approximate formula

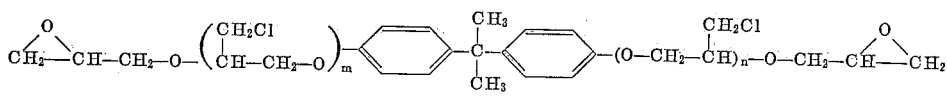

wherein the average value of the sum of $m$ and $n$ is about 6. Some properties and uses thereof are also shown.

A slurry was prepared containing 2 moles of 2,2-bis(4-hydroxyphenyl)propane in 1200 ml. of benzene. To this slurry, 10 ml. of $BF_3$-etherate was added and the mixture heated to 65° C. 13.3 moles of epichlorohydrin was then slowly added with cooling to maintain a temperature of 60°–70° C. When all the epichlorohydrin had been added, the mixture was heated at 60° C. for an additional hour. The reactants were thus combined in a ratio of 6.65 parts of epichlorohydrin to 1 part bisphenol.

The total reaction product was treated with 360 g. of 50% aqueous sodium hydroxide at reflux temperature. Water was removed by azeotropic distillation. After 2¾ hours, the removal of water was complete. The mixture was filtered and the ether flashed off. The resulting product was a glycidyl ether as noted above. It was a viscous light yellow liquid. Analysis of the product showed it to contain 21.7% chlorine, 0.175 eq./100 g. epoxy, a chlorohydrin value of 0.003 eq./100 g. and hydroxyl value of 0.004 eq./100 g. The polymer had a molecular weight of about 1000.

100 parts of the above glycidyl ether was slightly warmed to reduce its viscosity and mixed with 7.5 parts of N-aminoethylpiperazine. The resulting viscous liquid mixture was cast between glass plates and held 4 hours at 125° C. A light yellow, clear and flexible casting was obtained. It had a stiffness in flexure of 1300 p.s.i., tensile strength of 2520 p.s.i., elongation at break of 196%, tear strength of 600 pounds per inch and water absorption of 1.6% per month. This cured product is thus tough and flexible, useful for a variety of applications including caulking compounds, foams and the like.

*Example II*

This example illustrates the preparation according to method B, supra, of a polymeric diglycidyl ether from tetrachlorobisphenol-A and epichlorohydrin.

A mixture of 0.2 mole of 2,2-bis(4-hydroxy-3,5-dichlorophenyl)propane, 2 moles of epichlorohydrin and 0.0074 mole of benzyldimethylamine was heated with stirring at 100° C. for 5 hours. The reaction product was stripped at a pressure of 3 mm. mercury at 125° C., resulting in a viscous yellow liquid of 0.215 equivalent epoxide per 100 g.

The last-mentioned product was dissolved in 200 ml. of benzene, treated with dry HCl and heated on a steam bath for a few minutes. After flashing, the residue contained only traces of acidity and epoxide.

The acid-treated product was combined with 1.5 ml. of $BF_3$-etherate. Slightly more than 1 mole of epichlorohydrin was then added dropwise while the temperature was maintained at 70° C. When the reaction appeared to slow down, an additional 0.7 ml. of $BF_3$-etherate was added to the flask. After completion of epichlorohydrin addition, the mixture was maintained at 70° C. for two more hours by heating.

One half mole of flaked sodium hydroxide was added to the reaction mixture and the resulting mixture stirred vigorously for 2½ hours at 50° C. The mixture was then filtered and the filtrate flashed at 1.5 mm. mercury and 140° C. This resulted in 154 g. of a cloudy, viscous liquid. The product was dissolved in benzene, washed with water, dried over magnesium sulfate and flashed again. Analysis of the product indicated that it contained 33.2% by weight chlorine, only 0.009 eq. chlorohydrin/100 g., and an epoxide value of 0.205 equivalent epoxy/100 g. The product consists essentially of compounds of the formula

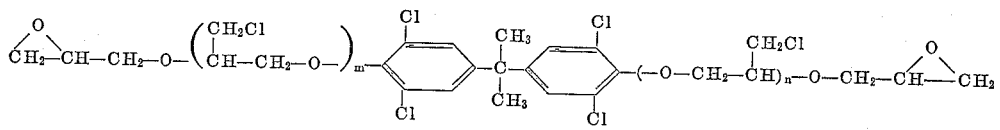

wherein the average value of $m+n$ is about 5.

I claim as my invention:

1. A process for preparing vic-epoxy ether which comprises
   (1) contacting a halo-monoepoxy substituted alkane of 3 to 12 carbon atoms per molecule which has a vic-epoxy group attached to a carbon atom bearing a halogen selected from the group consisting of chlorine and bromine, with a polyhydric phenol having at least two phenolic hydroxyl groups, said phenolic hydroxyl groups being the sole groups thereof which are reactive with the epoxy groups of said substituted alkane, in a reaction mixture containing a catalytic amount of an anhydrous basic condensation catalyst and at least 5 moles of the former per phenolic hydroxyl group of the latter, whereby no more than one molecule of said halo-monoepoxy-substituted alkane is added per phenolic group of said polyhydric phenol,
   (2) removing residual basic compounds and unconverted halo-epoxy-substituted alkanes and any dimers thereof from the product of step (1),
   (3) contacting the product of step (2) with anhydrous hydrogen halide in which the halogen is the same as that of said halo-monoepoxy-substituted alkane, whereby any vic-epoxy groups in said product are converted to halohydrin groups, (4) removing any unreacted hydrogen halide from the product of step (3), (5) contacting the product of step (4) with at least 1½ moles, per hydroxy group of said phenolic compound, of halo-monoepoxy-substituted alkane in the presence of a Lewis acid catalyst, whereby a product is obtained which contains in combined form an average of at least 2.5 of said halo-monoepoxy-substituted alkane molecules for each ether linkage arising from one of said phenolic hydroxyls and wherein each terminal monomer unit contains a halohydrin group, and (6) then subjecting the product of step (5) to dehydrohalogenation whereby the halohydrin groups of said polyalkoxyalkane are converted to epoxy groups.

2. A process for preparing vic-epoxy ether which comprises (1) contacting epichlorohydrin with 2,2-bis(4-hydroxy-3,5-dichlorophenyl)propane in a reaction mixture containing a catalytic amount of benzyldimethylamine and at least 5 moles of epichlorohydrin per phenolic hydroxyl group of said phenol, whereby no more than one molecule of epichlorohydrin is added per hydroxyl group of said phenol, (2) removing residual basic compounds and unconverted epichlorohydrin and any dimer thereof from the product of step (1), (3) contacting the product of step (2) with anhydrous hydrogen chloride, whereby any vic-epoxy groups in said product are converted to chlorohydrin groups, (4) removing any unreacted hydrogen chloride from the product of step (3), (5) contacting the product of step (4) with at least three moles of epichlorohydrin in the presence of a $BF_3$-etherate as catalyst, whereby a product is obtained which contains in combined form at least 2.5 epichlorohydrin molecules for each ether linkage arising from one of said phenolic hydroxyls and wherein each terminal monomer unit contains a chlorohydrin group, and (6) then contacting the product of step (5) with at least one mole of sodium hydroxide per chlorohydrin group of said product, whereby said groups are converted to epoxy groups.

References Cited by the Examiner

UNITED STATES PATENTS

| | | | |
|---|---|---|---|
| 2,260,753 | 10/41 | Marple et al. | 260—2 |
| 2,581,464 | 1/52 | Zech | 260—47 |
| 2,712,000 | 6/55 | Zech | 260—47 |
| 2,864,805 | 12/58 | Cooke | 260—47 |
| 3,016,362 | 1/62 | Wismer | 260—47 |
| 3,074,974 | 1/63 | Gebura | 260—47 |

OTHER REFERENCES

Moeller: "Inorganic Chemistry," John Wiley and Sons, Inc., New York, 1952.

WILLIAM H. SHORT, *Primary Examiner.*

MILTON STERMAN, HAROLD N. BURSTEIN,
*Examiners.*